Patented Jan. 28, 1930

1,744,735

UNITED STATES PATENT OFFICE

ERNST BERL, OF DARMSTADT, GERMANY

PROCESS FOR TREATING BODIES OF HIGHLY-POROUS CHARACTER

No Drawing. Application filed March 8, 1924, Serial No. 697,954, and in Germany March 16, 1923.

It is well known that substances of highly porous character such as active charcoal or amorphous silica often give rise to undesirable oxidation processed. For instance oxygen (oxygen of the air) adsorbed by active charcoal may under certain conditions lead to spontaneous combustion of the adsorbents. In the same way oxidizable substances, which have been adsorbed by bodies of highly porous character may be altered to a large extent by oxidation processes in an undesirable manner.

If gas mixtures containing, for instance, sulphur dioxide are treated with bodies of highly porous character for instance active charcoal or amorphous silica for the purpose of separating the sulphur dioxide which is easily adsorbed, from gaseous compounds which are not as easily adsorbed for instance from admixtures of air, 20 to 60 percent of the sulphur retained by the adsorbents, in the form of sulphur dioxide are converted into sulphuric acid, according to the nature of the highly porous substance used and the working method employed, especially if moisture is present. Hereby in addition to the great loss of sulphur dioxide the adsorbing efficiency of the highly porous substance is greatly diminished through the deposition of the sulphuric acid.

It was found that such an undesirable oxidation process can be prevented or greatly lessened by impregnating the highly porous bodies with small quantities of certain compounds or substances. Suitable means of impregnation are for instance tin compounds e. g. stannous chloride, stannous sulphate, stannous hydroxide, stannic tetrachloride, furthermore polyvalent alcohols e. g. glycerin, sugar, mannite, etc. In the place of one particular substance only several can be used for impregnation. Liquid means of impregnation may be applied as such. Otherwise the impregnation is generally carried out in such a way that the means of impregnation or substances which are capable of producing them, for instance by chemical reaction, are introduced in the form of aqueous or organic solutions into the bodies of highly porous character, the excess of solvent being removed afterwards. Other suitable means of impregnation can be found out by testing.

Examples.

1. The substance of highly porous character i. e. active charcoal or amorphous silica is treated with a very dilute solution of stannous chloride and dried. If the highly porous substance thus treated is used for the absorption of for instance sulphur dioxide, undesirable oxidation process either do not occur at all or only a few hundredths of a percent is converted into sulphuric acid.

2. Active charcoal is treated with a dilute solution of stannous chloride and by adding dilute sodium hydrate stannous hydroxide is precipitated in the charcoal. An activated charcoal thus prepared shows, even at elevated temperatures, a much smaller affinity to oxygen while the adsorbing capacity is practically unchanged. In consequence the temperature of ignition of the charcoal after the preliminary treatment is much higher than of untreated charcoal.

3. Active charcoal is impregnated with a sugar solution and more or less thoroughly freed from water by heating, preferably in vacuo.

4. Glycerin or aqueous solutions of glycerin are mixed thoroughly with active charcoal preferably for instance by moistening the previously heated charcoal while in a vacuo with the liquids in question excluding the air. The excess of water is then removed by heating preferably in vacuo.

In the appended claims by the term negative oxidation catalyst, I mean to include substances which act to inhibit oxidation reactions, such substances being tin compounds such as stannous chloride, stannous sulphate, stannous hydroxide, stannic chloride, polyvalent alcohol such as glycerine, sugar, mannite, or mixtures thereof.

Claims:

1. An adsorbent material adapted to adsorb oxidizable gases without promoting the oxidation thereof comprising a gas adsorbent material containing a negative oxidation catalyst comprising stannous hydroxide.

2. In the process of adsorbing oxidizable gases, the step which comprises passing the gas to be adsorbed into contact with a gas adsorbent material containing a negative oxidation catalyst.

3. In the process of adsorbing oxidizable gases, the step which comprises passing the gas to be adsorbed into contact with a gas adsorbent material containing a negative oxidation catalyst comprising a tin compound.

4. In the process of adsorbing oxidizable gases, the step which comprises passing the gas to be adsorbed into contact with a gas adsorbent material containing a negative oxidation catalyst comprising stannous hydroxide.

5. An adsorbent material adapted to adsorb oxidizable gases without promoting the oxidation thereof comprising an active gas adsorbent material containing a negative oxidation catalyst.

6. An adsorbent material adapted to adsorb oxidizable gases without promoting the oxidation thereof comprising an active gas adsorbent material containing a negative oxidation catalyst, comprising a tin compound.

In testimony whereof I affix my signature.

ERNST BERL.